W. G. TURNER.
MEANS FOR SECURING BALE TIES.
APPLICATION FILED AUG. 13, 1918.
1,332,649.
Patented Mar. 2, 1920.
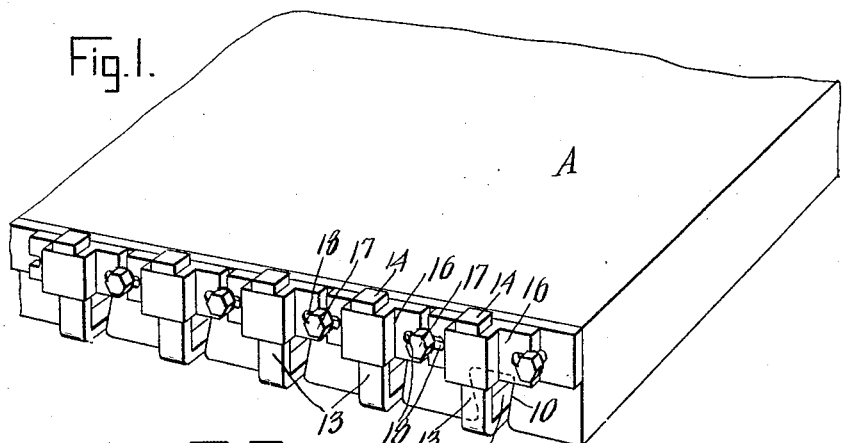
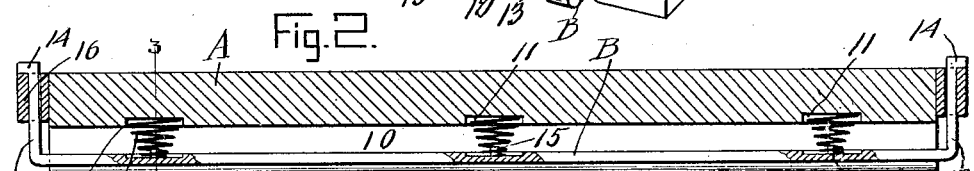
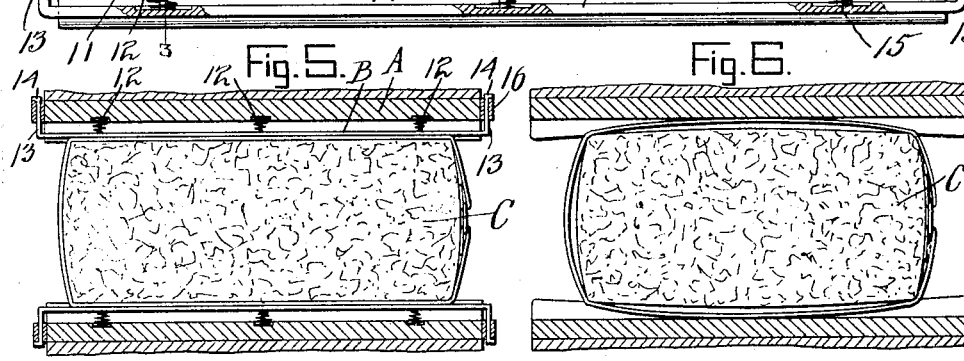
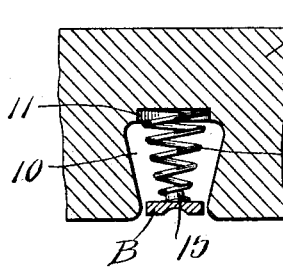
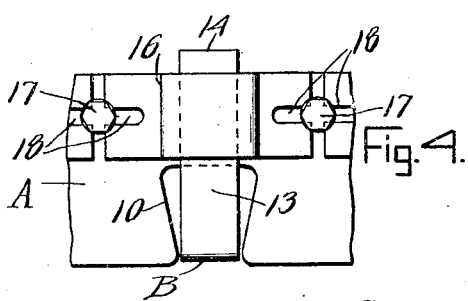
Inventor
William G. Turner
By Bedford & Doolittle
Attorneys.

UNITED STATES PATENT OFFICE.

WILLIAM G. TURNER, OF MEMPHIS, TENNESSEE.

MEANS FOR SECURING BALE-TIES.

1,332,649.   Specification of Letters Patent.   Patented Mar. 2, 1920.

Application filed August 13, 1918. Serial No. 249,675.

*To all whom it may concern:*

Be it known that I, WILLIAM G. TURNER, a citizen of the United States, residing at Memphis, Shelby county, and State of Tennessee, have invented and discovered certain new and useful Improvements in Means for Securing Bale-Ties, of which the following is a specification.

My said invention consists in certain improvements in the details of construction of means for holding the tension of the ties for cotton bales during the process of tying, whereby the compression is retained to a greater degree than is possible by the means commonly employed, and a bale of comparatively high density secured. Said improvements relate particularly to certain details of that construction more fully illustrated and described in my application No. 236,592, filed May 25, 1918, and are for the purpose of providing a structure of a somewhat simpler character and adapted for a wider range of adjustment.

Referring to the accompanying drawings, which are made a part hereof and on which similar reference characters indicate similar parts.

Figure 1 is a perspective view showing one corner of the upper platen of a cotton compress constructed in accordance with my said invention, Fig. 2, a cross section through the same on the line of one of the channels, Fig. 3, a detailed view showing one of the channels and bars therein in cross section scale, Fig. 4, a detail edge view, Fig. 5, a cross section through a bale of cotton as it appears in the compress just before being released after tying with the assistance of my invention, and Fig. 6, a similar view showing the bale of cotton as it appears when tied without the assistance of my said invention.

In said drawings the portions marked A represent the platen, B the spring mounted filler bars, and C the bales of cotton.

The platen A is formed with channels 10 preferably somewhat wider at their inner than at their outer portions, and extending entirely across the face of both the upper and lower platens at appropriate intervals, from end to end thereof. The bottom of each channel is formed with a series of recesses 11 in each of which is mounted a spring 12.

The filler bars B are of a width adapted to pass easily through the mouth of the channels and of a length to embrace the width of each platen having ends 13 bent at right angles with their main portions and the extremities of said ends 13 are formed with overhanging clips or flanges 14. Lugs 15 are preferably formed on the inner faces of said bars around which the coiled springs 12 engage, said springs being thus given a support at both ends, the inner ends in seats 11 and the outer ends on the lugs 15. Metal sockets 16 adapted to embrace the ends of the bars are mounted on the edges of the platen by means of lag-screws 17, which engage with slots 18 in horizontal flanges formed on said sockets. The flanges of adjacent sockets approach near to each other so that the head of one of the screws 17 will embrace the edges of the flanges of two adjacent sockets and serve to clamp them in position. The slots 18 are elongated so as to permit an adjustment of the sockets on the edges of the platen in relation to each other and in relation to the channels 10 in which the bars B are mounted. The overhanging flanges 14 limit the outward movement of the bars to a position substantially flush with the main surface of the platens.

By reason of the peculiar construction of the sockets, including the interlocking slots and screws, the exact position of the bar is easily secured without extra care in locating the perforations for the screws 17 and the holes in the bars, as in the construction in my application above referred to. Much machine work is obviated in the construction of the device and other advantages secured which are of importance in the use and operation of the apparatus.

That by the use of this invention the bale is tied by inserting the ties between the bale of cotton and the presser bars B, which hold the ties closely against the sides of the compressed bale while the operator is making the tie and thus the ties are secured with but comparatively little slack therein, which prevents undue expansion when the compress is opened. In Fig. 6 the old method is illustrated which shows the slack commonly found in the tie after the tying operation has been completed and indicates the expansion that takes place when the compress is opened.

Having thus fully described my said invention, what I claim as new and desire to secure by Letters Patent is:

1. In a cotton compress the combination with a platen thereof, formed with transverse channels therein, of presser bars mounted in said channels, springs interposed between said bars and the bottom of said channels, and sockets adjustably secured on the edges of said platen and engaging with bars connected with said bars for limiting the movement thereof under the pressure of said springs, substantially set forth.

2. In a cotton compress the combination with a platen thereof formed with transverse grooves in its face, presser bars mounted under spring pressure in said grooves, each of said presser bars being formed with ends bent at right angles to embrace the edges of the platen with flanges on the extremities of the bent portions, and sockets mounted on the edges of said platen adapted to receive the ends of said bars and each being secured to have an independent adjustment, substantially set forth.

3. In a cotton compress the combination with a platen having transverse channels, of a bar mounted in each of said transverse channels, springs mounted between said bars and the platen, sockets on the edges of said platen in which bent up ends of said bars are adapted to slide, and means for securing and adjusting said sockets, substantially set forth.

In witness whereof, I have hereunto set my hand and seal at Memphis, Tennessee, this seventh day of August, A. D. nineteen hundred and eighteen.

WILLIAM G. TURNER. [L. S.]

Witnesses:
J. H. GANNON,
A. L. HUDDLESTON.